United States Patent Office 2,920,503
Patented Jan. 12, 1960

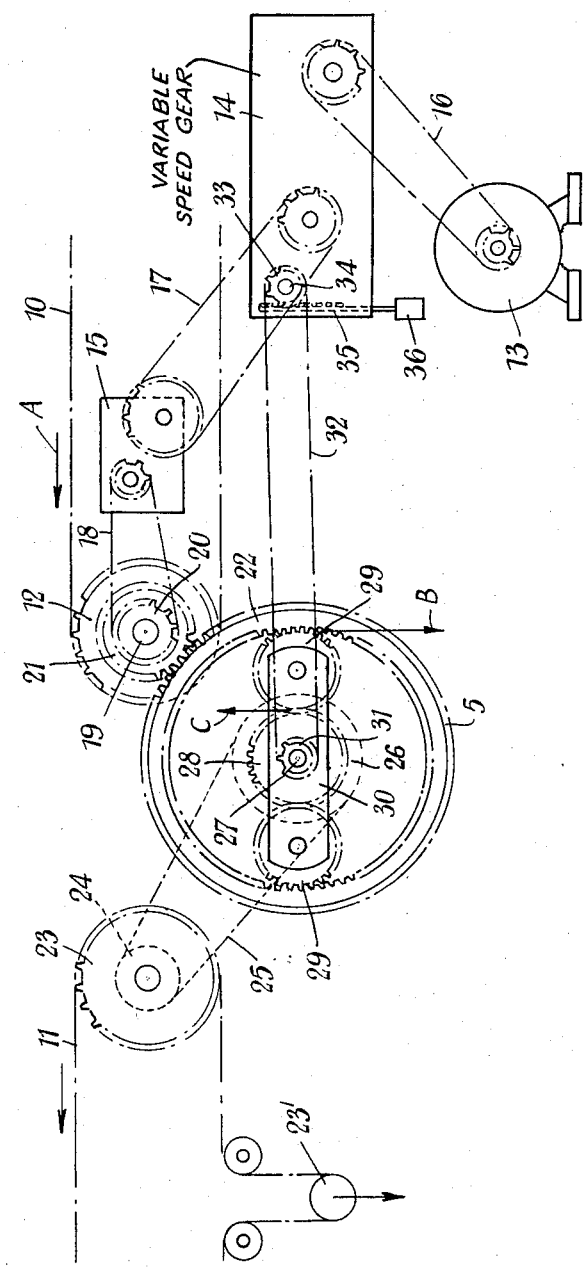

---

2,920,503

MEANS FOR ATTAINING SYNCHRONISM BETWEEN INDEPENDENTLY DRIVEN ENDLESS CHAINS OR OTHER MEMBERS

Arthur Thomas Charles Burrows, Stevenage, England, assignor to Geo. W. King Limited, Stevenage, England, a British company Application March 20, 1957, Serial No. 647,388

Claims priority, application Great Britain March 27, 1956

4 Claims. (Cl. 74—675)

This invention relates to a method of and means for attaining synchronism between two independently driven endless chains or other members.

In conveyor systems incorporating two or more independently driven conveyor belts or driving chains or the like it is often necessary to ensure that such belts, chains or the like shall be driven at the same or substantially the same speeds and it is an object of the invention to provide mechanical means wherein such requirements may effectively be met.

According to the invention the two driven members between which synchronism is required are coupled to a common epicyclic gear assembly in such a way that difference in speed of rotation of said members will result in angular movement of said assembly there being means whereby such angular movement resultant upon difference in speeds will be transmitted to a variable speed gear incorporated in the drive to one of said members thereby to vary the drive to said latter member and thus to bring the said two members into synchronism.

In order that the invention may be clearly understood and readily carried into effect the same will be hereinafter more fully described with reference to the accompanying diagrammatic drawing which shows one embodiment by way of example.

Referring now to the drawing 10 and 11 denote two endless conveyor chains which it is required to drive at the same speed. The chain 10 passes around and is driven by a sprocket 12 which in the embodiment illustrated is driven from a motor 13 via a variable speed gear 14 of known type and a gear box 15. In the embodiment illustrated the drives from the motor to the variable speed gear 14, from the latter to the gear box 15 and from the latter to the sprocket 12 are shown as chain drives 16, 17 and 18 respectively but obviously other drive transmitting means might well be employed. Fixedly mounted on the shaft 19 carrying the sprocket 12 and its chain drive sprocket 20 is a gear wheel 21 which is adapted to mesh with an externally toothed ring 22 forming part of an epicyclic gear assembly.

The chain 11 passes around an idler sprocket 23 the actual driving sprocket for such chain not being shown. 23' indicates a chain tensioning device which in practice would be disposed further away from the idler sprocket 23 and nearer to the driving sprocket for said chain 11. Associated with the idler sprocket 23 is further sprocket 24 which is drivingly connected by means of a chain 25 with the sprocket 26 carried by a shaft 27 which also carries the sun pinion 28 of the aforementioned epicyclic gear assembly. Meshing with the pinion 28 are two planetary pinions 29 which are rotatably journalled in a cage 30, said pinions 29 being also adapted to mesh with internal teeth on the aforesaid ring 22. Fixedly mounted on the cage 30 is a further sprocket wheel 31 which is drivingly connected by means of a chain 32 with a sprocket 33 carried by the speed control shaft 34 of the variable speed gear 14. 35 denotes a rack which is adapted to cooperate with a pinion carried by the shaft 34 said rack which is coupled to a dashpot or other similar device indicated at 36 being adapted to prevent "hunting" of the shaft 34.

When the chains 10 and 11 are being driven in the direction indicated by the arrow A the toothed ring 22 of the epicyclic gear assembly will be driven in the direction of the arrow B while the sun pinion 28 will be driven in the direction of the arrow C. It the speeds of drive of the two chains 10 and 11 are equal then the planet pinions while rotating will nevertheless remain stationary in relation to their angular position about the shaft 27, i.e. there will be no angular movement of the cage 30. If, however, the speed of the chain 10 increases with respect to that of the chain 11 so that the speed of the ring 22 increases with respect to that of the sun pinion 28 then the planet pinions 29 and their cage 30 will move angularly in the direction of the arrow B. This angular movement of the cage 30 will result in angular movement of the sprocket wheel 31 which will be transmitted by the chain 32 and sprocket 33 to the speed control shaft 34 of the variable speed gear 14 thereby to vary the latter in such a manner as to reduce the speed of the chain 10 so that it will be brought back into synchronism with the chain 11. Similarly if the speed of the chain 11 were to increase relatively to that of the chain 10 the cage 30 would be moved angularly in the direction of the arrow C with the result that a correction would be applied to the control shaft 34 to bring about an appropriate increase in the speed of the chain 10.

Owing to the elasticity and inertia of the various components of the conveyors a certain amount of over running will tend to occur while the synchronising system is functioning i.e. the variable speed gear will tend to over adjust itself in the direction in which it is being regulated. It is for this reason that the dashpot device 36 is incorporated since upon suitable adjustment of such device it will be possible to eliminate this over running tendency and to limit the adjustment of the shaft 34 to the amount actually required.

It will be apparent that the system above described is capable of many variations. For example instead of transmitting angular motion of the cage 30 to the shaft 34 by means of the chain drive shown it would be feasible to employ a rack and pinion mechanism for that purpose. Again instead of transmitting the drive of the idler sprocket 23 to the sun wheel 28 by means of a chain other drive means may be employed or possibly the sun wheel may be mounted on the same shaft as that carrying said idler sprocket.

It will be understood that the input and output elements of the epicyclic gear assembly, i.e. the sun pinion 28 and the ring 22 must revolve in opposite directions. Thus if it were the case that the chain sprockets i.e. the sprockets 12 and 23, were revolving in the same direction it would be necessary to incorporate an idler gear either between the sun pinion or the ring 22 and its appropriate sprocket in order to obtain the desired result.

It will be obvious that if a series of independently driven chains were present it would be possible by interposing between successive chains mechanism of the kind above described to arrange for variations in drive speeds to be transmitted successively from one chain to the other thereby to maintain the whole series in synchronism.

Although the invention is primarily concerned with conveyor chain drives it will be apparent that its application is not necessarily so limited.

I claim:

1. Means for attaining synchronism between the speeds of travel of two independently driven endless traction means one of which passes around a driven terminal wheel, while the other passes around an idler terminal wheel, such wheels being disposed in conveniently spaced relation, such means comprising an epicyclic gear assembly including an externally toothed ring rotatable about a fixed axis, a sun pinion rotatable about said fixed axis at least two planetary pinions meshing with said sun pinion, a cage supporting said planetary pinions and movable angularly about the aforesaid axis and an internally toothed annular element with which the planetary pinions also mesh, a gear wheel coupled to said driven terminal wheel and meshing with said internally toothed ring first drive transmission means between the driven terminal wheel and the annular element, second drive transmission means between the idler terminal wheel and the sun pinion, said second drive transmission means being independent of said first drive transmission means, a variable speed gear device coupled between said first drive transmission means and said driven terminal wheel and means effective upon angular movement of said cage resultant upon difference in speed between the two terminal wheels to actuate the variable speed gear device thereby to vary the drive to said driven terminal wheel and to bring said two wheels into synchronism.

2. Means for attaining synchronism between the speeds of travel of two independently driven endless traction means one of which passes around a driven terminal wheel, said driven terminal wheel having a gear wheel coupled thereto and rotatable therewith, while the other passes around an idler terminal wheel, such wheels being disposed in conveniently spaced relation, such means comprising an epicyclic gear assembly including an externally toothed ring meshing with said gear wheel and rotatable about a fixed axis, a sun pinion rotatable about said fixed axis, at least two planetary pinions meshing with said sun pinion, a cage supporting said planetary pinions and movable angularly about the aforesaid axis and an internally toothed annular element with which the planetary pinions also mesh, first drive transmission means between the driven terminal wheel and the annular element, second drive transmission means between the idler terminal wheel and the sun pinion, said second drive transmission means being independent of said first drive transmission means, a variable speed gear device coupled between said first drive transmission means and said driven terminal wheel, said variable speed gear device including speed control shaft to which angular movements of the cage are transmitted, there being a pinion on said shaft, a rack cooperating with said pinion and a dashpot device associated with said rack thereby to prevent "hunting" of said shaft on angular movement thereof resultant upon angular movement of the cage and means effective upon angular movement of said cage resultant upon difference in speed between the two terminal wheels to actuate the variable speed gear device thereby to vary the drive to said driven terminal wheel and to bring said two wheels into synchronism.

3. Means for attaining synchronism between the speeds of travel of two independently driven endless conveyor chains one of which passes around a driven terminal sprocket while the other passes around an idler terminal sprocket, such sprockets being disposed in conveniently spaced relation such means comprising an epicyclic gear assembly including a sun pinion rotatable about a fixed axis, at least two planetary pinions meshing with said sun pinion, a cage supporting said planetary pinions and movable angularly about the aforesaid axis and an annular element toothed both internally and externally, the planetary pinions meshing with the internal teeth on said annular element, a gear wheel coupled to the driven terminal sprocket and meshing with the external teeth of said annular element, drive transmission means between said idler terminal sprocket and the sun pinion, a drive independent of said drive transmission means for driving said driven terminal, a variable speed gear device incorporated in the drive to said driven terminal sprocket and means effective upon angular movement of said cage resultant upon difference in speed between the two terminal sprockets to actuate the variable speed gear device thereby to vary the drive to said driven terminal sprocket and to bring said two sprockets into synchronism.

4. Means for attaining synchronism between the speeds of travel of two independently driven endless conveyor chains as claimed in claim 3 in which the variable speed gear device includes a speed control shaft to which angular movements of the cage are transmitted, there being a pinion on said shaft, a rack cooperating with said pinion and a dashpot device associated with said rack thereby to prevent "hunting" of said shaft on angular movement thereof resultant upon angular movement of the cage.

References Cited in the file of this patent

UNITED STATES PATENTS

| 2,263,371 | Tolnai | Nov. 18, 1941 |
| 2,392,226 | Butterworth et al. | Jan. 1, 1946 |
| 2,512,008 | Bickel | June 20, 1950 |
| 2,781,616 | Estabrook | Feb. 19, 1957 |
| 2,808,922 | Lutman | Oct. 8, 1957 |

FOREIGN PATENTS

| 152,996 | Switzerland | Feb. 8, 1930 |